Oct. 24, 1933.  E. N. BALDWIN  1,932,062
BRAKE FOR ELEVATOR GOVERNOR SHEAVES
Filed Nov. 26, 1930
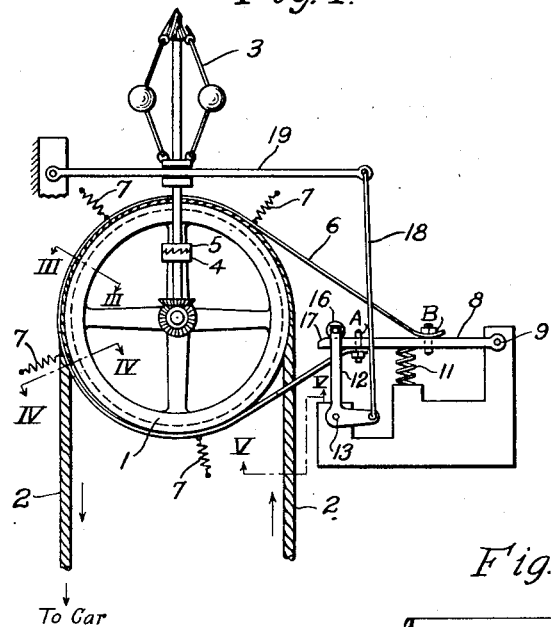
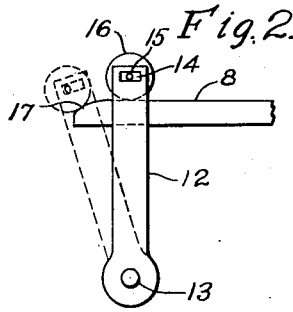
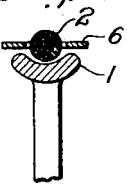
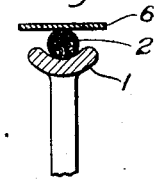
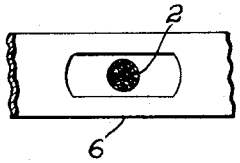
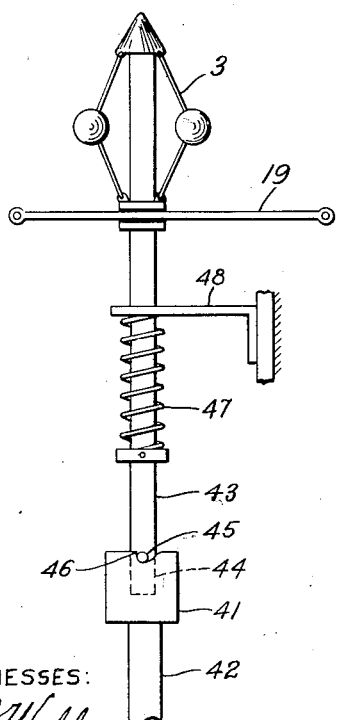
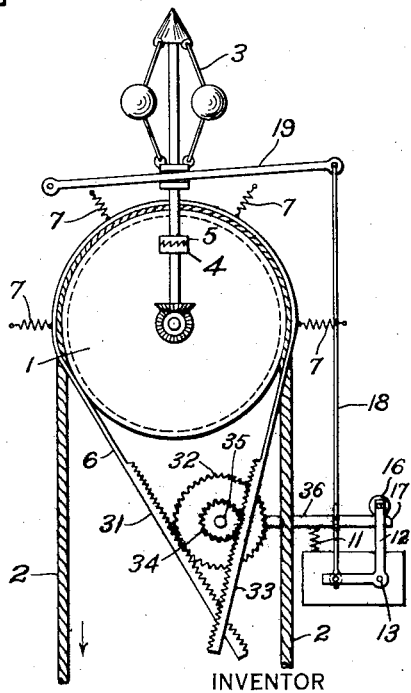
WITNESSES:
C. J. Weller
F. T. Hicks
INVENTOR
Edward N. Baldwin.
BY
Wesley G. Carr
ATTORNEY Patented Oct. 24, 1933

1,932,062

UNITED STATES PATENT OFFICE 1,932,062

BRAKE FOR ELEVATOR-GOVERNOR SHEAVES

Edward N. Baldwin, Chicago, Ill., assignor to Westinghouse Electric Elevator Company, a corporation of Illinois Application November 26, 1930
Serial No. 498,390

12 Claims. (Cl. 188—188)

My invention relates to brakes for elevator governor sheaves and more specifically to flexible brake bands for snubbing the governor sheaves and ropes to actuate the safety device when emergency conditions occur.

It has been customary practice in elevator installations to provide a pair of clamp jaws adjacent to the governor to stop the governor rope and safety cable when the governor trips. Such rope-gripping jaws are often injurious to the governor rope since they grip it so violently at one point as to sometimes tear or fray the rope. Furthermore, if the jaws do not clamp the rope violently, they cannot apply sufficient braking force to stop it, since they act only at one point. Another disadvantage encountered in the use of the conventional rope-gripping jaws is that the friction of the tripping mechanism renders its operation slow, indeterminate and inaccurate.

It is, accordingly, an object of my invention to provide an elevator-governor-rope gripping device which, when actuated, shall operate to apply a braking force over a wide area in order to stop and hold the rope without injuring it.

Another object of my invention is to provide a governor-rope gripping device which will automatically apply a braking force to the rope which shall be proportional to the force necessary to stop and hold it.

It is also an object of my invention to provide means for tripping the governor-rope gripping device which will operate quickly and accurately to grip the governor rope and set the safety device at a predetermined speed.

In accordance with my invention, I provide a flexible brake band passing around the governor sheave outside of the rope. The ends of the brake band are anchored to prevent rotation with the sheave. A quick-releasable actuating means is provided for drawing the band taut about the rotating sheave and rope to apply a snubbing action and create a braking force between the band and the rope. A portion of the braking force is diverted to increase the snubbing force, whereby the braking force is still further increased. This action is cumulative, and the braking force is thereby automatically increased until it is sufficient to stop and hold the governor rope.

The invention itself, however, both as to its organization and its mode of operation, together with additional objects and advantages thereof, will best be understood from the following description of a specific embodiment, when read in conjunction with the accompanying drawing, in which:

Figure 1 is a view showing a side elevation of one form of my invention;

Fig. 2 is an enlarged detail view of a portion of the quick releasing mechanism;

Figs. 3, 4 and 5 are enlarged views taken on section lines III—III, IV—IV, and V—V of Fig. 1, respectively, Fig. 6 is a view showing a side elevation of a modified form of my invention, and Fig. 7 is a detail view showing a driving connection for the governor.

Referring to the drawing, the apparatus shown in Fig. 1 comprises a governor sheave 1 and a governor rope 2 passing around the sheave. One side of the rope 2 extends down the hatchway to an elevator car, as indicated by the arrow. As is customary with such devices, my device is effective to grip the governor rope only when the car is descending. Hence, the device is operative only when the sheave is rotating counter-clockwise, and rotation of the sheave referred to throughout the specification is always counter-clockwise.

Associated with the sheave is a governor 3 which is driven thereby through a releasable connector. The connector drives the governor during normal operation but permits it to run free if the sheave is suddenly stopped when the car is descending. Such a connector may comprise a lower portion 4 and an upper portion 5, each of which is provided with cooperating ratchet like teeth inclining more acutely on one side than on the other.

Passing around the sheave 1 is a flexible brake band 6 which is disposed over, and outside of, the governor rope 2, as shown in Fig. 3. Portions of the band are slotted to permit the passage of the governor rope therethrough, as shown in Figs. 4 and 5, taken respectively on section lines IV—IV and V—V of Fig. 1. The ends of the flexible brake band are anchored to a pivoted lever 8, at points A and B, by any suitable fastening means, such as screws or bolts. Being anchored, the band cannot rotate with the sheave 1, and, when it is slack, it slides lightly over the rope or is held in spaced relation thereto by springs 7, although pins or other means may be employed for the same purpose. The end of the band which extends from the approaching side of the sheave (counterclockwise rotation) is fastened to the free end of the lever 8 at A, and the end of the band extending from the receding side of the sheave is fastened to an intermediate portion of the lever at B. The ratio of the moment arms 9—A and 9—B may be selected to suit the particular installation, and the brake band may be lined with suitable material, if desired.

The lever 8 which anchors the band is pivotally mounted on a pivot pin 9, with its free end extending toward the sheave 1. A biasing spring 11 tends to rotate the lever 8 clockwise to tension the brake band 6, but a pivoted latch arm 12 normally holds it retracted in opposition thereto.

The latch device comprises a bifurcated arm 12 pivotally mounted on a shaft 13 and extending upwardly above the brake lever 8 on each side thereof. The upper ends of the arm 12 which extend above the brake lever 8 are provided with slots 14 which receive axially-extending pins 15 for pivotally supporting a roller 16 therebetween, as shown in Fig. 2. The upper face of the free end of the brake lever 8 is provided with a cam surface 17 of such curvature, relative to the radius of rotation of the roller, that the tension of the biasing spring 11 normally resists the movement of the roller to the left. The cam surface is such, however, that, when the roller 16 is rotated beyond a predetermined point thereon, the force applied by the tension of the biasing spring 11 suddenly snaps it to the left and releases the brake lever 8.

The sudden movement of the roller 16 to the left is facilitated by the pin-and-slot connection of the roller 16 to the ends of the latch arm 12. As the roller starts its free movement beyond the critical point of the cam, over the corner of the lever 8, the pin 15 moves from the right-hand end of the slot 14 toward the left, and the roller is free to move independently of the latch arm 12.

In order to actuate the device in response to overspeed conditions, the pivoted latch arm 12 is connected, by a link 18, to a governor lever 19 which is controlled by the governor 3. As its speed of rotation increases, the governor 3 lifts its lever 19 and link 18 which causes the latch arm 12 to turn counter-clockwise. The friction losses in the operation of the device are very much reduced, since all the sliding friction has been omitted. When the speed becomes excessive, the roller will be moved to such a point on the cam surface that it will be suddenly snapped to the left, and the brake lever 8 will be released.

After the brake lever 8 is released, it is rotated clockwise by the biasing spring 11, thereby pulling up on the end of the brake band at point A and applying a snubbing force thereto. Because of the snubbing action of the band on the rotating sheave, a very slight pull or snubbing force on the end of the band attached at a point A will cause a strong braking force to be applied.

As the snubbing force is applied to the end of the brake band at point A, the resultant braking force will, in turn, react, through the other end of the band, on the brake lever at point B, thereby setting up a moment of rotation about the pivot point 9 which still further increases the force applied to the other end of the band through point A. This action is cumulative and increases quickly until the braking force becomes great enough to clamp and stop the governor rope.

Thus, the governor rope is clamped firmly and suddenly, with no damage to the rope. The clamping is so rapid that the release mechanism 4 and 5 permits the governor 3 to run free and stop gradually without injury.

In Fig. 6, I have shown a modification of my device wherein a different form of actuating mechanism is provided. In this embodiment of my invention, rack gears are attached to the ends of the flexible brake band 6 and are so disposed that they cooperate with a large and a small gear wheel fixedly secured to a rotatable shaft 35. The rack gear 31, which is attached to the end of the band which extends from the approaching side of the sheave, is disposed in cooperative relation to the large gear wheel 32. The other rack gear 33 is disposed in cooperative relation to the opposite side of the small gear wheel 34. Both gear wheels are secured to the same shaft 35, and normally anchor the ends of the brake band to prevent rotation with the sheave. A crank 36, fixedly secured to the shaft 35 and extending laterally therefrom, is biased upwardly by the spring 11 but is normally latched down in opposition thereto by a pivoted latch arm 12. The latch arm 12 carries a roller 16 pivotally mounted in slots in the upper end thereof.

To normally hold the latch arm 12 and roller 16 in engaging relation to the upper face of the crank 36, a link 18 is secured to an arm which extends laterally from the latch arm. The link extends upwardly to the pivoted governor lever 19 which is raised or lowered in accordance with the elevator speed.

As the speed increases, the latch arm 12 is turned in a clockwise direction. When the speed becomes excessive, the roller 16 is carried to such point on the cam surface that it is suddenly snapped to the right by the force of the biasing spring 11. The quick-release mechanism is practically identical with that shown in Figs. 1 and 2 except that the latch arm is turned in the opposite direction.

After the crank 36 is released, the spring 11 rotates it counterclockwise to such position that the brake band 6 is drawn taut about the rotating sheave and governor rope. The snubbing action then causes the rack gear 33 to pull up and rotate the gears still further in a counterclockwise direction which, in turn, pulls down the rack gear 31 and increases the snubbing action. As a result of this cumulative action, the braking force automatically increases until the sheave and the governor rope are brought to rest.

In Fig. 7, I have shown a form of release mechanism suitable for driving the governor comprising a cup member 41 which is attached to the end of the driving shaft 42. The end of the governor shaft 43 is received within an orifice 44 provided by the cup member. A pin 45 extends diametrally through the governor shaft and projects from each side thereof. The rim of the cup member is notched at 46 to receive the protruding ends of the pin 45 which nest therein. As shown, one side of the notch 46 is inclined very steeply but the other is inclined gently. Mounted in concentric relation on the governor shaft is a spring 47, which is depressed by a standard or bracket 48, to thrust the shaft 43 into the cup and hold the pins in their respective notches.

In the event that the rotation of the driving shaft 42 is suddenly stopped, the ends of the pins 45 will climb the inclined sides of notches 46, and the governor will run free and come to rest gradually without injury. Such releasable driving connection may be used for driving the governor in conjunction with either modification of my invention.

It is seen therefore, that I have provided an elevator governor and rope-clamping device which, in the event of over-speeding, operates rapidly to automatically apply a sufficient braking force to stop the governor rope and sheave without damaging the rope; a release device which releases the brake quickly and with a minimum of friction, whereby it is possible to predetermine the tripping speeds more accurately and definitely; and a releasable governor-driving mechanism which enables the governor to run free to stop gradually without injury.

I desire it to be understood that my invention is not to be restricted in scope except insofar as is necessitated by the prior art and by the spirit of the appended claims.

I claim as my invention:

1. In combination, a sheave, a rope passing around said sheave, a flexible brake band disposed around the sheave over the rope, means for anchoring the ends of the brake band to prevent rotation of the band with the sheave, actuating means for drawing the band taut to apply a snubbing force and create a braking force between the band and the rope, said means being relatively arranged for diverting a portion of the braking force to increase the snubbing force, whereby the braking force is further increased.

2. In combination, an elevator governor sheave, a rope passing around said sheave, a speed-responsive device, releasable driving means for driving the speed-responsive device from the sheave, whereby the device will be free to rotate after the sheave is suddenly retarded, a flexible brake band disposed around th sheave over the rope, means for anchoring the ends of the brake band to prevent rotation of the band with the sheave, actuator means associated therewith for drawing the band taut to apply a snubbing force and create a braking action between the band and the rope, and latching means controlled by said speed responsive device for holding said actuator means in ineffective position at normal speeds.

3. In combination, an elevator governor sheave, a rope passing around said sheave, a speed-responsive device, releasable driving means for driving the speed-responsive device from the sheave, whereby the device will be free to rotate after the sheave is suddenly retarded, a flexible brake band disposed around the sheave over the rope, means for anchoring the ends of the brake band to prevent rotation of the band with the sheave, means for drawing the band taut to apply a snubbing force and create a braking action between the band and the rope, means for diverting a portion of the braking force to increase the snubbing force, whereby the braking force is further automatically increased to the degree necessary to stop and hold the sheave, and latching means controlled by said speed responsive device for holding said actuator means in ineffective position at normal speeds.

4. In combination, a sheave, a rope passing around said sheave, a flexible brake band disposed around the sheave and over the rope, a pivoted brake lever, means for anchoring the ends of the brake band to the lever to prevent rotation of the band with the sheave, the pivot point of the lever and the points of attachment of the ends of the brake band thereto being so related that the pivoted lever will be rotated thereby to draw the band taut and automatically apply the degree of braking force necessary to stop and hold the sheave.

5. In combination, a sheave, a rope passing around said sheave, a flexible brake band disposed around the sheave and over the rope, a pivoted brake lever, means for anchoring the ends of the brake band to the lever to prevent rotation of the band with the sheave, the pivot point of the lever and the points of attachment of the ends of the brake band thereto being so related that the pivoted lever will be rotated thereby to draw the band taut and automatically apply the degree of braking force necessary to stop and hold the sheave, and latching means for normally locking the lever in band slackening position.

6. In combination, a sheave, a rope passing around said sheave, a flexible brake band disposed around the sheave and over the rope, a pivoted brake lever, means for anchoring the ends of the brake band to the lever to prevent rotation of the band with the sheave, the pivot point of the lever and the points of attachment of the ends of the brake band thereto being so related that the pivoted lever will be rotated thereby to draw the band taut and automatically apply the degree of braking force necessary to stop and hold the sheave, biasing means for urging the pivoted lever to band-tightening position, and latching means for normally locking the lever in band-slackening position.

7. In combination, a sheave, a rope passing around said sheave, a flexible brake band disposed around the sheave and over the rope, a pivoted brake lever, means for anchoring the ends of the brake band to the lever to prevent rotation of the band with the sheave, the pivot point of the lever and the points of attachment of the ends of the brake band thereto being so related that the pivoted lever will be rotated thereby to draw the band taut and automatically apply the degree of braking force necessary to stop and hold the sheave, biasing means for urging the pivoted lever to band tightening position, and latching means for normally locking the lever in band-slackening position, and means for releasing said latching means comprising a speed-responsive device driven by said sheave.

8. In combination, a sheave, a rope passing around said sheave, an overspeed governor driven by the sheave, braking means responsive to said governor for stopping and holding the sheave and rope comprising a flexible brake band passing around the sheave and rope, a pivoted brake lever, means for fastening the ends of the band to the pivoted brake lever, biasing means tending to rotate said brake lever about its pivot, quick-releasable latching means for normally holding said lever in opposition to the biasing means comprising a cam surface on the free end of the lever, a roller, a latch arm responsive to said governor, and a lost-motion connection between the latch arm and the roller, whereby the latch arm normally controls the movement of the roller over the cam surface but, when the speed becomes excessive, the roller passes beyond the point of stable equilibrium on the cam and is snapped aside by the pivoted brake lever as it swings free to apply the brake.

9. In combination, a pivoted lever having a cam surface on the free end thereof, a spring for biasing said lever to rotate about its pivot, a quick-releasable latching means for normally locking said lever in opposition to the spring comprising a roller, a latch arm, a lost-motion connection between the roller and the latch arm, whereby the latch arm moves the roller over the cam surface until it passes beyond the point of stable equilibrium and thereafter the pivoted lever snaps it aside as the lever swings free.

10. In combination, a sheave, a rope passing around said sheave, a flexible brake band disposed around the sheave over the rope, a large gear wheel and a small gear wheel secured to a shaft, a rack gear attached to each end of the flexible band, one of said rack gears being disposed in operative engagement with the teeth on one side of the small gear wheel and the other being disposed in operative engagement with the gear teeth on the opposite side of the large gear wheel, whereby rotation of the shaft in one direction will draw the band taut about the sheave and rope for applying a snubbing force to create a braking force between the band and the rope, and a portion of the braking force will be diverted to further increase the snubbing force.

11. In combination, a sheave, a rope passing around said sheave, a flexible brake band disposed around the sheave over the rope, a large gear wheel and a small gear wheel secured to a shaft, a rack gear attached to each end of the flexible band, one of said rack gears being disposed in operative engagement with the teeth on one side of the small gear wheel and the other being disposed in operative engagement with the gear teeth on the opposite side of the large gear wheel, whereby rotation of the shaft in one direction will draw the band taut about the sheave and rope for applying a snubbing force to create a braking force between the band and the rope, and a portion of the braking force will be diverted to further increase the snubbing force, a speed-responsive device driven from the sheave, and biased means released thereby for rotating said shaft to apply a braking force to the sheave and rope when its speed exceeds a predetermined limit.

12. In combination, a sheave, a rope passing around the sheave, a flexible brake band disposed around the sheave over the rope, means for normally holding the brake band away from the sheave and rope, and means for drawing the band taut about the rope to apply a snubbing force to the band, said last named means including means so connected with said band that the snubbing action will automatically create a braking force sufficient to stop the sheave and rope.

EDWARD N. BALDWIN.